(12) United States Patent
Bélanger et al.

(10) Patent No.: US 6,776,735 B1
(45) Date of Patent: Aug. 17, 2004

(54) BASEBALL BAT

(75) Inventors: Bruno Bélanger, Apex, NC (US); Gary Riggs, Wake Forest, NC (US); Robert Zillioux, Raleigh, NC (US); Kamal Kassouf, Lancaster, OH (US)

(73) Assignee: Reichhold, Inc., Durham, NC (US)

( * ) Notice: Subject to any disclaimer, the term of this patent is extended or adjusted under 35 U.S.C. 154(b) by 128 days.

(21) Appl. No.: 09/458,926

(22) Filed: Dec. 10, 1999

Related U.S. Application Data (60) Provisional application No. 60/151,719, filed on Aug. 31, 1999, and provisional application No. 60/112,244, filed on Dec. 14, 1998.

(51) Int. Cl.[7] .............................................. A63B 59/06
(52) U.S. Cl. ................................................... 473/567
(58) Field of Search ............................... 473/561, 567, 473/FOR 169, FOR 170

(56) References Cited

U.S. PATENT DOCUMENTS

| | | | |
|---|---|---|---|
| 4,000,214 A | 12/1976 | Lum et al. .................. 260/835 |
| 4,032,143 A | 6/1977 | Mueller et al. ........... 273/72 R |
| 4,092,025 A | 5/1978 | Yanagioka ................ 273/72 R |
| 4,180,598 A | 12/1979 | Emmons ...................... 427/44 |
| 4,323,239 A | 4/1982 | Ishii ......................... 273/72 A |
| 4,433,080 A | 2/1984 | Laganis et al. ............. 523/414 |
| 4,572,508 A | 2/1986 | You .......................... 273/72 R |
| 4,714,251 A | 12/1987 | Cook ........................ 273/72 R |
| 4,848,745 A | 7/1989 | Bohannan et al. ........ 273/72 R |
| 5,114,144 A | 5/1992 | Baum ....................... 273/72 R |
| 5,115,072 A | 5/1992 | Nava et al. .................... 528/67 |
| 5,180,163 A | 1/1993 | Lanctot et al. ............ 273/72 R |
| 5,218,031 A | 6/1993 | Nayder et al. ............... 524/376 |
| 5,301,940 A | 4/1994 | Seki et al. ................ 273/72 R |
| 5,303,917 A | 4/1994 | Uke .......................... 273/72 R |
| 5,362,545 A | 11/1994 | Tingley ....................... 428/96 |
| 5,382,626 A | 1/1995 | Credali et al. .............. 525/126 |
| 5,395,108 A | 3/1995 | Souders et al. ........... 273/72 R |
| 5,409,214 A | 4/1995 | Cook ........................ 273/72 R |
| 5,426,169 A | 6/1995 | Starner ........................ 528/103 |
| 5,439,215 A * | 8/1995 | Ratchford ................... 473/561 |
| 5,456,781 A | 10/1995 | Tingley ....................... 156/154 |

(List continued on next page.)

FOREIGN PATENT DOCUMENTS

| | | | |
|---|---|---|---|
| EP | 0742 266 A2 | 11/1996 | |
| GB | 2 053 696 A | 2/1981 | |
| JP | 401148281 * | 6/1989 | ........ 473/FOR 169 |
| JP | 10057537 | 3/1998 | |
| WO | WO 91/14480 | 10/1991 | |

OTHER PUBLICATIONS

Dodd, Mike, "Bat Battle Hits Key Juncture," USA Today, Tuesday, Dec. 15, 1998, p. 3C.

International Search Report, PCT/US99/29392, May 22, 2000.

*Primary Examiner*—Mark S. Graham
(74) *Attorney, Agent, or Firm*—Myers Bigel Sibley & Sajovec

(57) ABSTRACT

The present invention provides a composite baseball bat having a core wherein the core is wound at various angles with continuous fibers. The fibers are impregnated with a resin such as an epoxy resin. The baseball bat can include a core having a barrel portion, handle portion and a longitudinal axis extending through core barrel and handle portions, the handle portion being narrower than the barrel portion; continuous first fibers wound around the core barrel portion at an angle of about 0° to 90° relative to a first plane normal to the longitudinal axis to provide at least one layer of first fibers around the core barrel portion; continuous second fibers wound around the core handle portion at an angle of about 35° to 55° relative to the first plane normal to the longitudinal axis to provide at least one layer of second fibers around the core handle portion; and a resin impregnated on the first and second fibers.

36 Claims, 3 Drawing Sheets

U.S. PATENT DOCUMENTS

| | | | |
|---|---|---|---|
| 5,458,330 A | 10/1995 | Baum | 273/72 R |
| 5,460,369 A | 10/1995 | Baum | 273/72 R |
| 5,533,723 A | 7/1996 | Baum | 273/72 R |
| 5,539,012 A | 7/1996 | Klemarczyk et al. | 522/13 |
| 5,567,748 A | 10/1996 | Klein et al. | 523/420 |
| 5,590,875 A | 1/1997 | Young | 473/457 |
| 5,609,806 A | 3/1997 | Walsh et al. | 264/136 |
| 5,624,115 A | 4/1997 | Baum | 473/567 |
| 5,654,077 A | 8/1997 | Wu et al. | 428/141 |
| 5,722,908 A | 3/1998 | Feeney et al. | 473/567 |
| 5,780,195 A | 7/1998 | Nava | 430/100 |
| 5,800,293 A | 9/1998 | MacKay, Jr. | 473/464 |
| 6,139,451 A * | 10/2000 | Hillerich, III et al. | 473/567 |

\* cited by examiner

BASEBALL BAT

RELATED APPLICATIONS

The present application bases priority on Provisional Application No. 60/112,244 entitled "Composite Wood Articles of Manufacture", filed Dec. 14, 1998 and Provisional Application No. 60/151,719 entitled "Baseball Bat", filed Aug. 31, 1999, the disclosure of which are incorporated by reference herein in their entirety.

FIELD AND BACKGROUND OF THE INVENTION

The present invention relates to a composite article of manufacture, and particularly a composite baseball bat suitable for replacing aluminum bats.

Various articles of manufacture are fabricated out of wood. Exemplary articles include boat hulls, pylons, bridges, beams, trusses, decking, masts, columns, and sports equipment including bats and rackets. There are, however, several limitations on the use of wood. Wood tends to crack, warp and rot when exposed to the elements requiring repair or replacement. An alternative has been to use wood laminates wherein multiple wood segments are bonded together such as glue-laminate members. However, such laminates often do not have the same physical and aesthetic characteristics as articles formed from a solid piece of wood. Certain types of wood are becoming short in supply such as mahogany for furniture and white ash for baseball bats. Also articles like baseball bats have performance and aesthetic characteristics that are difficult to simulate unless a solid piece of wood is used.

Most leagues other than Major League Baseball exclusively use metal (aluminum) bats. Historically, this was primarily as a cost savings measure in that wooden bats break easily and are expensive to replace. Today, most leagues other than Major League Baseball had converted to aluminum bats because of the savings primarily in the replacement of broken bats. Most metal bats are made principally of aluminum which can be coated to look like wood but which perform differently than wood bats and are known to create a metallic pinging sound rather than the traditional "crack of the bat" heard when a wood bat impacts a ball. Moreover, metal bats are considered aesthetically unpleasing by some more traditionally oriented individuals who are used to the typical appearance, performance and sound made by the impact of a wood bat.

Metal bats are distinctly advantageous in that, while more expensive to manufacture, they do not break and can therefore be used repeatedly with consequent cost savings. Metal bats are however, coming under increased scrutiny due to the speed of the ball off of the bat. By coming off a metal bat faster, pitchers and other players and spectators are at increased risk of being hurt because of reduced reaction time. Although metal bats have a larger "sweet spot" and generally perform better than wood and have been found acceptable at levels from Little League up through college baseball, metal bats have not yet been approved for Major League or minor league baseball use, partly because the ball speed off the metal bat is faster and, secondly, because of the undesirable pinging sound normally associated with metal bats.

Many leagues are however considering banning metal bats primarily because of the safety issues, and secondarily because of performance issues. As outlined in the USA Today, Dec. 15, 1998 issue, Section C, page 3, the NCAA was considering banning metal bats for the 1999 season because of performance, namely the NCAA wanted baseball "closer to its traditional form" and cites "runaway bat performance" as a consideration. Additionally, the NCAA expressed a concern that the high performance metal bats are so lively that players and spectators, particularly pitchers are unable to react quick enough.

The National Federation of High Schools (NFHS) has adopted new rules with respect to make aluminum bats more akin to wooden bat performance. The rule would require non-wood bats have 2⅝ inch maximum barrel diameter, a minus 3 unit maximum differential based on length to weight ratio, and a minimum moment of inertia (MOI) of 9000 0 z-in$^2$ measured at the 6 inch point from the knob. The NFHS believes that such a weight and MOI would cause the effort required to swing such a non-wood bat to replicate the effort required to swing a wooden bat. Additionally, a maximum exit ball speed is being considered. See, NFHS Press Release of Aug. 3, 1999.

Various attempts have been made to either provide composite baseball bats using wood or to provide composite baseball bats simulating wood more than conventional aluminum bats. For example, U.S. Pat. No. 4,032,143 to Mueller et al. proposes an aluminum core surrounded by a form plastic body. Such a bat is said to be a lighter and less expensive bat suited for younger players (See, Column 1, lines 41–42).

U.S. Pat. No. 4,572,508 to Young proposes a baseball bat formed by a plurality of laminations held together by dovetail-shaped grooves and ridges. Layers of carbon fibers impregnated with a thermosetting resin are sandwiched between the wooden laminations to provide strength and shock absorbing characteristics.

U.S. Pat. No. 4,848,745 to Bohannon et al. proposes a cured foam core bat or bowling pin having circumferentially wound fibers sandwiched between two layers of fibers aligned with the longitudinal axis of the bat.

U.S. Pat. Nos. 5,114,144, 5,460,369 and 5,460,369 all to Baum disclose wood composite baseball bats having an aluminum core overwrapped with a composite reinforcing layer and covered with an outer layer of resin coated wood veneer. These bats are complex and expensive to manufacture, and uses an actual wood exterior to achieve the performance and appearance of a wood bat.

U.S. Pat. No. 5,301,940 to Seki et al. proposes a method of molding a baseball bat by winding reinforcing fibers around a core, placing this in a mold and injecting a resin which is a crosslinked polyaminoamide resin, a crosslinked epoxy modified polyamidoamide resin or a polyesteramide resin into the mold and curing the bat.

U.S. Pat. No. 5,395,108 to Sauders et al. proposes a synthetic wood composite bat comprising a shell of fiber reinforced resin material, a fiber tube inside the shell and a rigid cured polyurethane form filling the shell and penetrating the inner portion of the tube.

U.S. Pat. No. 5,409,214 to Cook proposes a baseball bat having a hollow metal handle portion and a solid wood barrel portion positioned in the handle portion.

U.S. Pat. No. 5,800,293 to MacKay, Jr. proposes a laminated wood bat constructed of a plurality of thin wood veneer bundled together throughout its facing surfaces.

None of these bats, however, sufficiently match the characteristics of existing wooden baseball bats. Therefore, it can be appreciated that there is still a need for an improved composite baseball bat structure.

It is therefore an object of the invention to provide a composite baseball bat substantially mimicking the appearance, performance and sound of a conventional all-wood bat.

It is another object of the invention to provide a composite baseball bat that replicates the effort required to swing an all-wood bat and results in substantially the same maximum exit ball speed and minimum moment of inertia as that of an all-wood bat.

It is yet another object of the invention to provide a composite baseball bat that is more durable than an all-wood bat.

SUMMARY OF THE INVENTION

To this end, the present invention provides a composite baseball bat. The baseball bat generally includes a core having a barrel portion and a handle portion wherein the core is wound at various angles with continuous fibers. The fibers are impregnated with a resin such as an epoxy resin.

In one embodiment, the baseball bat comprises a core having a barrel portion, handle portion and a longitudinal axis extending through core barrel and handle portions, the handle portion being narrower than the barrel portion; continuous first fibers wound around the core barrel portion at an angle of about 0° to 90° relative to a first plane normal to the longitudinal axis to provide at least one layer of first fibers around the core barrel portion; continuous second fibers wound around the core handle portion at an angle of about 35° to 55° relative to the first plane normal to the longitudinal axis to provide at least one layer of second fibers around the core handle portion; and a resin impregnated on the first and second fibers.

In another embodiment, the baseball comprises a core having a top barrel portion, a throat portion, a transition portion between the barrel and throat portions, a handle portion adjacent the throat portion and a bottom knob portion, and a longitudinal axis extending through the barrel, throat, transition, handle and knob portions, the handle portion being narrower than the barrel portion; continuous first fibers wound around the core barrel portion at an angle of about 35° to 55° relative to a first plane normal to the longitudinal axis to provide at least one layer of first fibers around the core barrel portion; continuous second fibers wound around the core throat portion at an angle of about 15° to 35° relative to the first plane normal to the longitudinal axis to provide at least one layer of second fibers around the core throat portion; continuous third fibers wound around the core transition portion between the barrel and throat portions at an angle of about 25° to 45° relative to the first plane normal to the longitudinal axis to provide at least one layer of third fibers around the core transition portion; continuous fourth fibers wound around the core handle portion at an angle of about 5° to 25° relative to the first plane normal to the longitudinal axis to provide at least one layer of fourth fibers around the core handle portion; continuous fifth fibers wound around the core knob portion at an angle of about 35° to 55° relative to the first plane normal to the longitudinal axis to provide at least one layer of fifth fibers around the knob portion; and a resin impregnated on the fibers. A method of making such a bat is also provided.

BRIEF DESCRIPTION OF THE DRAWINGS

The accompanying drawings, which are incorporated in and constitute a part of the specification, illustrate embodiments of the invention and, together with the description, serve to explain principles of the invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figures 1, 2, 2A:
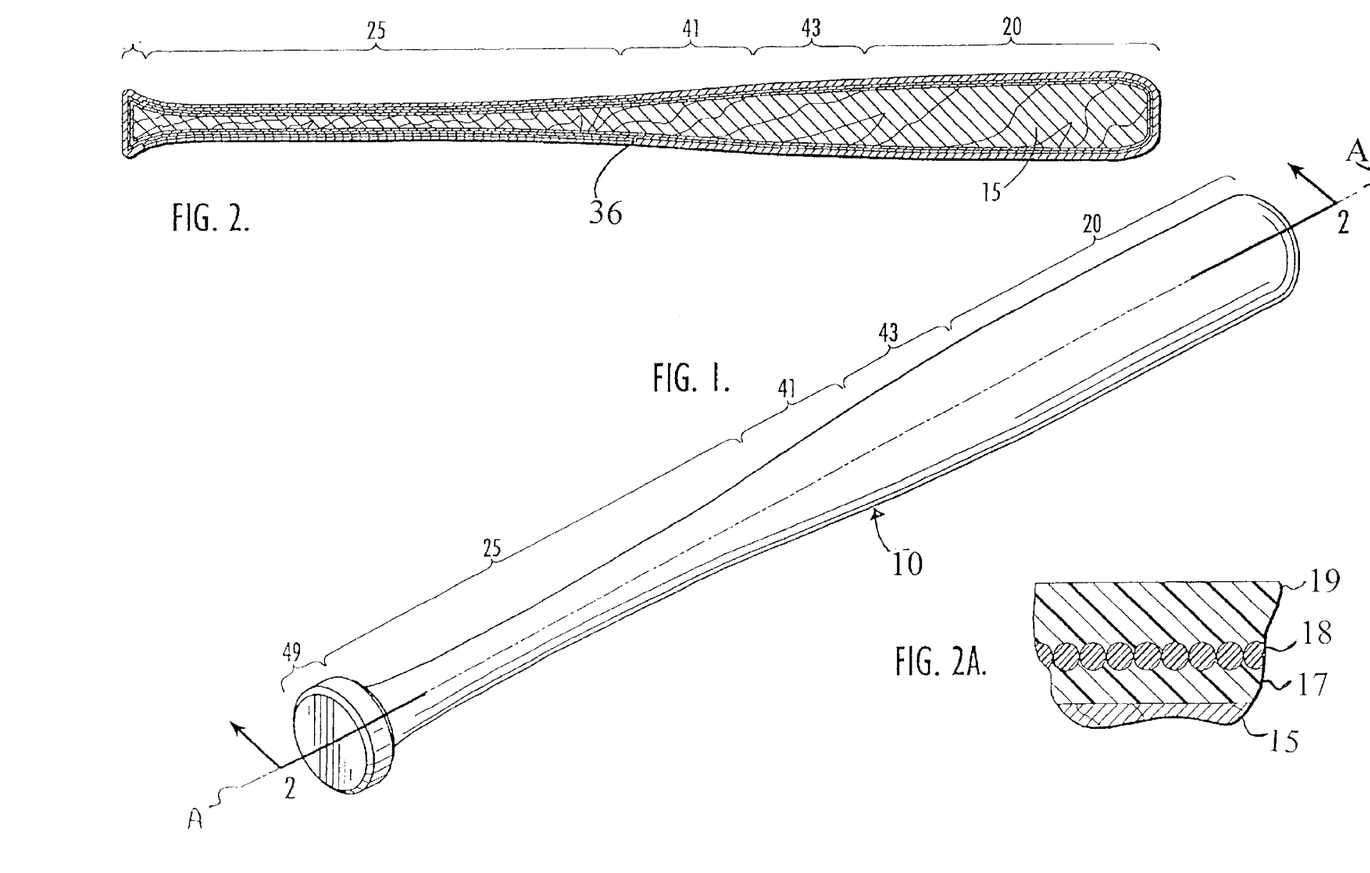
FIG. 1 is a perspective view of a baseball bat of the present invention.
FIG. 2 is a sectional view of the baseball bat taken along line 2—2 of FIG. 1.
FIG. 2A is a cross-sectional view of a portion of a baseball bat with one of the winding pattern embodiments of the present invention.

Referring to FIGS. 1 and 2, the baseball bat 10 comprises a core 15 having a barrel portion 20, a handle portion 25, a throat portion 41, a transition portion 43 between the barrel portion and the throat portion, and a knob portion 49. A longitudinal axis A extends through the core and its various portions. It is understood that although a baseball bat has been described, the present invention is applicable to other bats such as those used to play softball and cricket, for example, and to clubs such as billy clubs.

Referring to FIG. 2A, in general, the core 15 is optionally coated with a first resin 17, namely a primer layer, wound with fibers 18 and then coated with a second resin 19. The core can be wood (e.g., ash, cottonwood, willow, etc.) or a polymeric material (e.g., polyurethane foam). The core is sized such that after winding the resulting bat will have the dimensions of a conventional bat. The moisture content of the wood should preferably be about 5 to 20 percent by weight, and preferably 8 to 14 percent by weight. The core also may be sanded or otherwise treated to improve adhesion of the core to the impregnated fibers.

Figure 3:
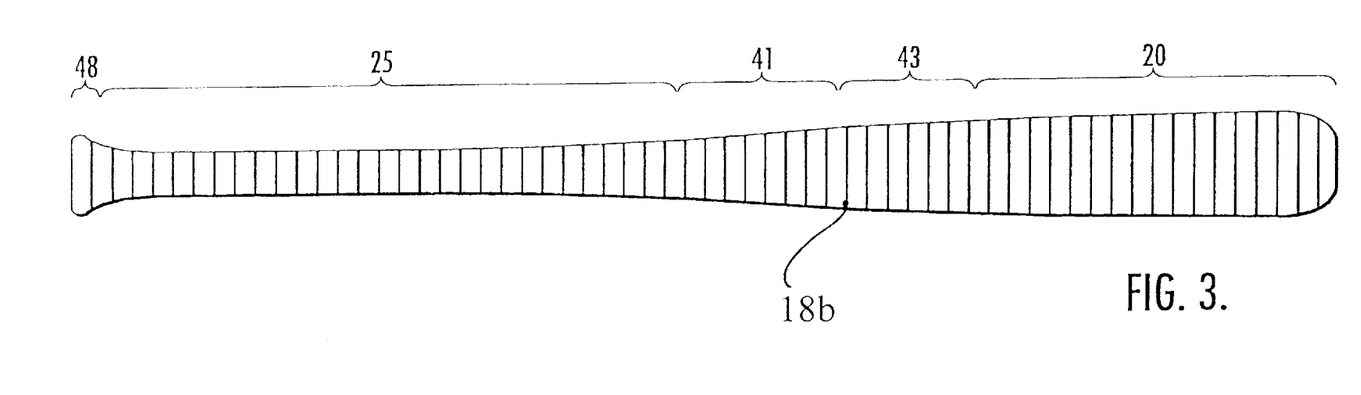
FIG. 3 is a side view of a baseball bat illustrating different portions of the bat.
Figure 4:
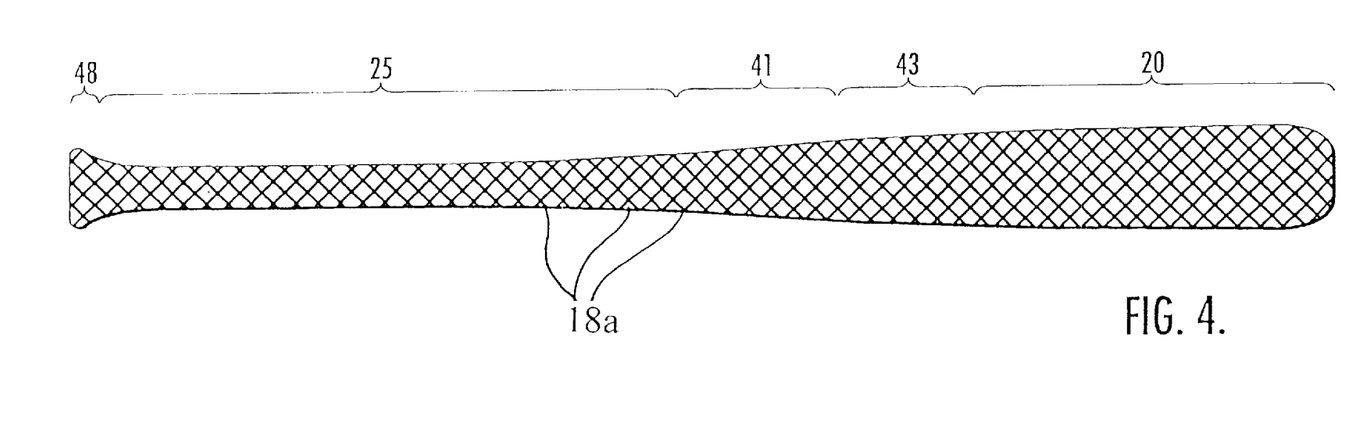
FIG. 4 is a side view of a baseball bat illustrating another one of the winding pattern embodiments of the present invention.

Various winding patterns can be used for the bat 10. For example, the bat 10 illustrated in FIG. 3 is entirely wound with a fiber 18a at an angle of about 0° relative to a first plane normal to the longitudinal axis A of the core 15. The bat illustrated in FIG. 4 is entirely wound with a fiber 18b at an angle of about 45° relative to a first plane normal to the longitudinal axis A of the core. Different portions of the bat 10 can be wound with different angles and different fibers.

Referring to FIG. 2, the core handle portion 25 can also include at least one reinforcing sheath 36. Preferably the fibers thereof are oriented at angle of about 90° relative to the first plane normal to the longitudinal axis A. The reinforcing sheath 36 can be in the form of cloth, roving mat, or biaxial or triaxial braid, and can be formed from a single fiber or combination of fibers. An example is V26L200X available from A&P Technology, Covington, Ky., and is an e-glass roving that is braided.

In a preferred embodiment, continuous first fibers are wound around the core barrel portion 20 at an angle of about 0° to 90° relative to a first plane normal to the longitudinal axis to provide at least one layer around the core barrel portion 20. Continuous second fibers are wound around the core handle portion at angle of about 35° to 55° relative to the first plane normal to the longitudinal axis to provide at least one layer of second fibers around said core handle portion. A resin is impregnated on the first and second fibers.

Figure 5:
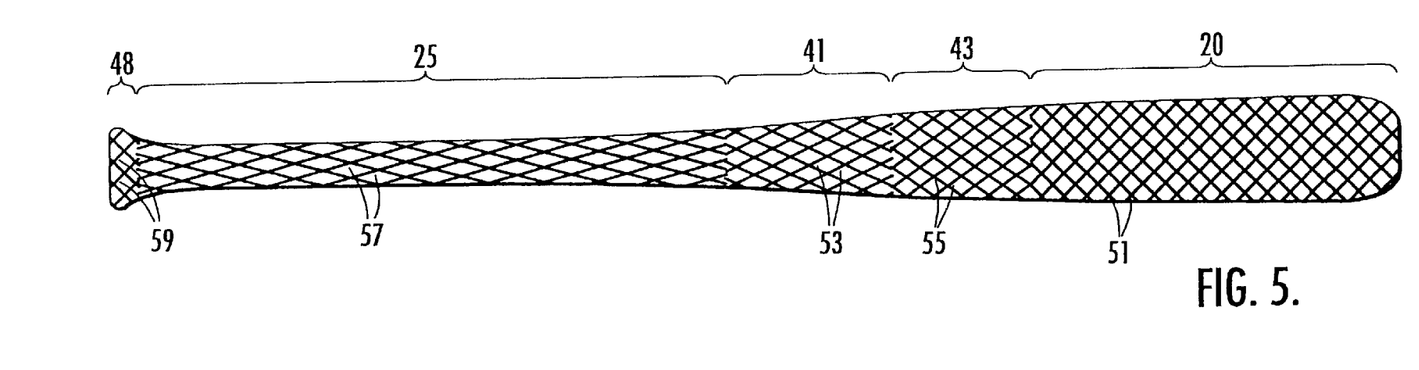
FIG. 5 is a side view of a baseball bat illustrating still another one of the winding pattern embodiments of the invention.

Referring to FIG. 5, another preferred embodiment is illustrated. Continuous first fibers 51 are wound around the core barrel portion 20 at an angle of about 35° to 55° (shown as 45°) relative to a first plane normal to the longitudinal axis A to provide at least one layer of first fibers around the core barrel portion 20. Continuous second fibers 53 are wound around said core throat portion 41 at an angle of about 15° to 35° (shown as 25°) relative to the first plane normal to the longitudinal axis A to provide at least one layer of second fibers around said core throat portion 41. Continuous third fibers 55 are wound around the core transition portion 43 between said barrel 20 and throat portions 41 at an angle of about 25° to 55° (shown as 35°) relative to the first plane normal to the longitudinal axis A to provide at least one layer of third fibers around the core transition portion 43. Continuous fourth fibers 57 are wound around the core handle portion 25 at an angle of about 5° to 25° (shown as 15°) relative to the first plane normal to the longitudinal axis A to provide at least one layer of fourth fibers around the core handle portion 25. Continuous fifth fibers 59 are wound around the core knob portion 48 at an angle of about 35° to 55° (shown as 45°) relative to the first plane normal to the longitudinal axis A to provide at least one layer of fifth fibers around the knob portion 48. Optionally, the entire bat can then be wound with a fiber at an angle of about 0° to 90° relative to the longitudinal axis such as fibers wound at an angle of 0° relative to the first plane normal to the longitudinal axis A. A resin 33 is impregnated on the fibers. A reinforcing sheath (not shown) can also be included in any of the portions, and is particularly desirable for the handle portion 25.

The continuous fibers of the present invention can be any fiber conventionally known in the art. Preferably, the fiber is adaptable to a conventional circumferential winding machine such as is available from McClean Anderson, Schofield, Wis. Suitable fibers comprise fiberglass, polyester, graphite, aramid or natural fibers. The fibers may be continuous or staple fibers and may be in the form of roving or mat. Preferably, the fiber comprises fiberglass roving. Preferably, high yield glass is used having a yield of from about 248 to 1048 yds/lb.

The resin for impregnating the fibers comprises a thermosetting or thermoplastic resin or mixture or blend thereof. Useful thermosetting resins include epoxies, saturated and unsaturated polyesters, styrenics, acrylics, polyimides, polyvinyl acetates, phenolics, vinyl esters, polyurethanes, polyamides, (meth)acrylates, poly(vinyl acetals), polystyrene/acrylonitrile copolymers, polyoxymethylene, urethane modified vinyl esters and the like and mixtures and blends thereof. Exemplary thermoplastic resins include polyvinylacetate, styrene butadiene copolymers, polymethylmethacrylate, polystyrene, cellulose acetatebutyrate, saturated polyesters, urethane-extended saturated polyesters, methacrylate-butadiene-styrene copolymers and the like. Like resins can be used as a primer applied to the bat prior to winding. Vinyl esters are a preferred primer.

In a preferred embodiment, the resin is an epoxy resin. The preferred epoxy resin comprises a Component A comprising a glycidyl ether of polyhydroxy hydrocarbons and a poly(oxyalkylene) epoxide and a Component B comprising a poly(oxyalkylene) amine and a phenol having 5 to 15 carbons. The suitable polyhydroxy hydrocarbon includes dihydroxy phenols, bisphenols, halogenated bisphenols, alkylated bisphenols, trisphenols, hydrogenated bisphenols, phenol-aldehyde resins, halogenated phenol-aldehyde novolac resins, alkylated phenol-aldehyde novolac resins, phenol-hydroxybenzaldehyde resins, alkylated phenol-hydroxybenzaldehyde resins, hydrocarbon-phenol resins, hydrocarbon-halogenated phenol resins, hydrocarbon-alkylated phenol resins and any combination thereof A suitable poly(oxyalkylene) epoxide is polyoxypropylene diepoxide. A suitable poly(oxyalkylene) amine is polyoxypropylene diamine. A suitable phenol is nonyl phenol.

Suitable unsaturated polyester resins include practically any esterification product of a polybasic organic acid or the alcohol, or both, provide the reactive ethylenic unsaturation. Typical unsaturated polyesters are those thermosetting resins made from the esterificaiton of a polyhydric alcohol with an ethylenically unsaturated polycarboxylic acid. Examples of useful ethylenically unsaturated polycarboxylic acids include maleic acid, fumaric acid, itaconic acid, dihydromuconic acid and halo and alkyl derivatives of such acids and anhydrides, and mixtures thereof. Exemplary polyhydric alcohols include saturated polyhydricalcohols such as ethylene glycol, 1,3-propanediol, propylene glycol, 1,3-butanediol, 1,4-butanediol, 2-ethylbutane-1,4-diol, 1,5-pentanediol, 1,6-hexanediol, 1,7-heptanediol, 1,8-octanediol, 1,4-cyclohexanediol, 1,4-dimethylolcyclohexane, 2,2-diethylpropane-1,3-diol, 2,2-diethylbutane-1,3-diol, 3-methylpentane-1,4-diol, 2,2-dimethylpropane-1,3-diol, 3-methylpentane-1,4-diol, 2,2-dimethylpropane-1,3-diol, 4,5-nonanediol, diethylene glycol, triethylene glycol, dipropylene glene glycol, glycerol, pentaerythritol, erythritol, sorbitol, mannitol, 1,1,1-trimethylolpropane, trimethylolethane, hydrogenated bisphenol A and the reaction products of bisphenol A with ethylene or propylene oxide.

Unsaturated polyester resins can also be derived from the esterification of saturated polycarboxylic acid or anhydride with an unsaturated polyhydric alcohol. Exemplary saturated polycarboxylic acids include oxalic acid, malonic acid, succinic acid, methylsuccinic acid, 2,2-dimethylsuccinic acid, 2,3-dimethylsuccinic acid, hydroxylsuccinic acid, glutaric acid, 2-methylglutaric acid, 3-methylglutaric acid, 2,2-dimethylglutaric acid, 3,3-dimethylglutaric acid, 3,3-diethylglutaric acid, 3,3-dimethylglutaric acid, 3,3-diethylglutaric acid, adipic acid, pimelic acid, suberic acid, azelaic acid, sebacic acid, phthalic acide, isophthalic acid, terephthalic acid, tetrachlorophthalic acid, tetrabromophthalic acid, tetrahydrophthalic acide, 1,2-hexahydrophthalic acid, 1,3-hexahydrophthalic acid, 1,4-hexahydrophthalic acid, 1,1-cyclobutanedicarboxylic acid and trans-1,4-cyclohexanedicarboxylic acid.

Unsaturated polyhdric alcohols which are suitable for reacting with the saturated polycarboxylic acids include ethylenic unsaturation-containing analogs of the above saturated alcohols (e.g., 2-butene-1,4-diol).

Suitable phenolic resins include practically any reaction product of an aromatic alcohol with an aldehyde. Exemplary aromatic alcohols include phenol, orthocresol, metacresol, paracresol, bisphenol A, p-phenylphenol, p-tert-butylphenol. Exemplary aldehydes include formadehyde, acetaldehyde, propionaldehyde, phenylacetaldehyde, and benzaldehyde. Particularly preferred, are the phenolic resins prepared by the reaction of phenol with formaldehyde.

Suitable vinyl ester resins include practically any reaction product of an unsaturated carboxylic acid or anhydride with an epoxy resin. Exemplary acids and anhydrides include (meth)acrylic acid, phthalic anhydride, α-chloroacrylic acid, crotonic acid, mono-methyl and mono-ethyl esters of maleic acid or fumaric acid, vinyl acetic acid, cinnamic acid, and the like. Epoxy resins which are useful in the preparation of the polyvinyl ester are well known and commercially available. Exemplary epoxies include virtually any reaction product of a polyfunctional halohydrin, such as epichlorohydrin, with a phenol or polyhydric phenol. Suitable phenols or polyhydric phenols include for example, resorcinol, tetraphenol ethane, and various bisphenols such as bisphenol A, 4,4'-dihydroxy-diphenylsulfone, 4,4'-dihydroxy biphenyl, 4,4'-dihydroxy-diphenylmethane, 2,2'-dihydroxydiphenyloxide, and the like.

Typically, the thermosetting resin matrix of the present invention can also include a vinyl monomer, in which the thermosetting resin is solubilized. Suitable vinyl monomers include styrene, vinyltoluene, methyl methacrylate, p-methylstyrene, divinyl benzene, diallyl phthalate and the like. Styrene is the preferred vinyl monomer for solubilizing unsaturated polyester or vinyl ester resins.

The thermosetting resin matrix typically also includes a thickening agent. Suitable thickening agents are commonly known to those skilled in the art and include, for example, crystalline unsaturated polyesters, polyurethanes, alkali earth metal oxides and hydroxides, and polyureas.

The present invention also includes a method of making a bat. For example, the method comprises first coating the core with a first resin. Continuous first fibers are wound around a barrel portion of the core to provide at least one layer of first fibers around the core barrel portion. Then continuous second fibers are wound around a throat portion of the core to provide at least one layer of second fibers around the core throat portion. Continuous third fibers are wound around a transition portion of the core to provide at least one layer of third fibers around the core transition portion. Then continuous fourth fibers are wound around a handle portion of the core to provide at least one layer of fourth fibers around the core handle.

Continuous fifth fibers are wound around a knob portion of the core to provide at least one layer of fifth fibers around the core knob portion. The fibers are then impregnated with a second resin.

The following examples illustrate specific embodiments of the present invention. In the examples and throughout the specification, all parts and percentages are by weight, unless otherwise indicated.

EXAMPLES

The glass used was OC 158B-AA-735 available from Owens Corning.

Primer Composition A: Two-component urethane polymer, Atprime 2 available from Reichhold, Inc., comprising 4 parts of bisphenol A fumarate resin diluted in styrene, methyl methacrylate and dibutyl tin laurate (B side) and 1 part isocyanate (A side).

Primer Composition B: 99.4% Dion Ver 9480 (epoxy novolac vinyl ester resin) available from Reichhold, Inc., 0.4% cobalt 12% and 0.2% dimethylanaline, 2.0 g (per 100 gram mix of the Primer Composition B) Superox® 46-747 (methyl ethyl ketone peroxide initiator) is added and the gel time is 5 to 6 minutes at 73° F.

Primer Composition C: Two-component system comprising 2 part of glycidyl ether of bisphenol A and polyoxypropylene diepoxide and 1 part of polyoxypropylene diamine and nonyl phenol. The primer is cured overnight.

Winding Resin A': 99.7% Atlac 580-05 urethane modified vinyl ester resin available from Reichhold, Inc., 0.2% cobalt 12% and 0.1% dimethyl analine, 2.0 g (per 100 gram mix of Winding Resin A') Superox® 46-747 (methyl ethyl ketone peroxide initiator) is added and the gel time is 42–47 minutes at 73° F.

Winding Resin B': 3 parts of glycidyl ether of bisphenol A and polyoxypropylene diepoxide and 1 part of a polyoxypropylene dianine and nonyl phenol.

Winding Pattern A: First layer consisting in a wrapping sequence of 45-35-25-15-45 wind angles for the barrel-transition-throat-handle-knob portions. This layer is overwrapped at an angle of 0° relative to the plane normal to the longitudinal axis.

Winding Pattern B: First layer consisting in a wrapping at an angle of 0° relative to the plane normal to the longitudinal axis. This layer is overwrapped using a sequence of 45-35-25-15-45 wind angles for the barrel-transition-throat-handle-knob portions.

Example 1

A bat was primed using the Primer Composition A, Winding Pattern B and Winding Resin A'. The resulting bat had an end weight of 31.7 ounces. The bat did resist up to 2400 hits and then the composite overwrap starts to deteriorate.

Example 2

The bat was primed with the Primer Composition B, Winding Pattern B and Winding Resin A'. The resulting bat had an end weight of 32.3 ounces. The composite overwrap started to wear through at 2250 hits. Some core delaminating in between the wood circles were noticed around 300 hits. The bat was still usable until 2250 hits.

Example 3

The bat was primed with the Primer Composition B, Winding Pattern B and Winding Resin B'. The resulting bat had an end weight of 31.7 ounces. The bat wore through the two layers after 1500 pitched hits and 5200 soft toss hits. Several cracks were noticed after these hits on the bat.

Example 4

The bat was primed with the Primer Composition C, Winding Pattern A and Winding Resin B'. The resulting bat had an end weight of 29.3 ounces. The bat did not have any visible cracks or any major surface related problems after 1500 hits.

Example 5

The bat was primed with the Primer Composition A, Winding Pattern B and Winding Resin B'. The resulting bat had an end weight of 30.5 ounces. After 2300 hits the overwrap was still intact. The hitters commented to really like the bat.

Example 6

The bat was primed with the Primer Composition C with the addition that the primer contained a thixotropic agent which provides a better sagging resistance when the bat was placed in vertical position to allow the primer to reach an acceptable degree of cure. The bat was wound using the Winding Pattern B and Winding Resin B'. The resulting bat had an end weight of 33.3 ounces. The bat was still good after 1500 hits. No cracks or wearing on the composites has been noticed.

Example 7

The bat was primed with the Primer Composition A, Winding Pattern B and Winding Resin B'. The resulting bat had an end weight of 31.3 ounces. The bat was still good after 1500 hits. No cracks or wearing on the composites has been noticed.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A baseball bat comprising:
   a core having a barrel portion, handle portion and a longitudinal axis extending through said core barrel and handle portions, said handle portion being narrower than said barrel portion;
   continuous first fibers wound only around said core barrel portion at an angle of about 0° to 90° relative to a first plane normal to the longitudinal axis to provide at least one layer of first fibers around said core barrel portion;
   continuous second fibers wound only around said core handle portion at an angle of about 35° to 55° relative to the first plane normal to the longitudinal axis to provide at least one layer of second fibers around said core handle portion; and
   a resin impregnated on said first and second fibers.

2. The baseball bat according to claim 1 wherein said core handle portion includes at least one reinforcing sheath having fibers oriented at an angle of about 90° relative to the first plane normal to the longitudinal axis and positioned between said core and said at least one layer of first fibers and said at least one layer of second fibers or both.

3. The baseball bat according to claim 1 wherein said resin impregnated on said first and second fibers is an epoxy resin comprising a Component A comprising a glycidyl ether of polyhydroxy hydrocarbons and a poly(oxyalkylene) epoxide and a Component B comprising a poly(oxyalkylene) amine and a phenol having 5 to 15 carbons.

4. The baseball bat according to claim 3 wherein the polyhydroxy hydrocarbon is selected from the group consisting of dihydroxy phenols, bisphenols, halogenated bisphenols, alkylated bisphenols, trisphenols, hydrogenated bisphenols, phenol-aldehyde resins, halogenated phenol-aldehyde novolac resins, alkylated phenol-aldehyde novolac resins, phenol-hydroxybenzaldehyde resins, alkylated phenol-hydroxybenzaldehyde resins, hydrocarbon-phenol resins, hydrocarbon-halogenated phenol resins, hydrocarbon-alkylated phenol resins and any combination thereof.

5. The baseball bat according to claim 3 wherein the poly(oxyalkylene) epoxide is polyoxypropylene diepoxide, the poly(oxyalkylene)amine is polyoxypropylene diamine and the phenol is nonyl phenol.

6. The baseball bat according to claim 1 wherein said core is wood.

7. The baseball bat according to claim 1 wherein said fibers are selected from the group consisting of fiberglass, polyester, graphite, aramids and natural fibers.

8. The baseball bat according to claim 7 wherein the fibers have a yield of about 248 yds/lb. to 1048 yds/lb.

9. The baseball bat according to claim 1, wherein said resin is selected from the group consisting of resins including epoxies, saturated and unsaturated polyesters, styrenics, acrylics, polyimides, olyvinyl acetates, polyurethanes, polyamides, (meth)acrylates, poly(vinyl acetals), polystyrene/acrylonitrile copolymers, polyoxymethylene, and urethane modified vinyl esters.

10. The baseball bat according to claim 9, wherein said resin is a urethane modified vinyl ester resin.

11. The baseball bat according to claim 10, wherein said vinyl ester resin is the reaction product of an unsaturated polycarboxylic acid with an epoxy resin.

12. A baseball bat comprising:
    a core having a top barrel portion, a throat portion, a transition portion between said barrel and throat portions, a handle portion adjacent the throat portion and a bottom knob portion and a longitudinal axis extending through said barrel, throat, transition, handle and knob portions, said handle portion being narrower than said barrel portion, the bat comprising:
    continuous first fibers wound only around said core barrel portion at an angle of about 35° to 55° relative to a first plane normal to the longitudinal axis to provide at least one layer of first fibers around said core barrel portion;
    continuous second fibers wound only around said core throat portion at an angle of about 15° to 35° relative to the first plane normal to the longitudinal axis to provide at least one layer of second fibers around said core throat portion;
    continuous third fibers wound only around said core transition portion between said barrel and throat portions at an angle of about 25° to 55° relative to the first plane normal to the longitudinal axis to provide at least one layer of third fibers around said core transition portion;
    continuous fourth fibers wound only around said core handle portion at an angle of about 5° to 25° relative to the first plane normal to the longitudinal axis to provide at least one layer of fourth fibers around said core handle portion;
    continuous fifth fibers wound around said core knob portion at an angle of about 35° to 55° relative to the first plane normal to the longitudinal axis to provide at least one layer of fifth fibers around said knob portion; and a resin impregnated on said fibers.

13. The baseball bat according to claim 12 wherein said core handle portion includes at least one reinforcing sheath positioned at about 0° relative to the first plane normal to the longitudinal axis and positioned between said core and the layer of first fibers or the layer of second fibers or both.

14. The baseball bat according to claim 12 wherein said resin is an epoxy resin comprising a Component A comprising a glycidyl ether of polyhydroxy hydrocarbons and a poly(oxyalkylene) epoxide and a Component B comprising a poly(oxyalkylene) amine and a phenol having 5 to 15 carbons.

15. The baseball bat according to claim 14 wherein the polyhydroxy hydrocarbon is selected from the group consisting of dihydroxy phenols, bisphenols, halogenated bisphenols, alkylated bisphenols, trisphenols, hydrogenated bisphenols, phenol-aldehyde resins, halogenated phenol-aldehyde novolac resins, alkylated phenol-aldehyde novolac resins, phenol-hydroxybenzaldehyde resins, alkylated phenol-hydroxybenzaldehyde resins, hydrocarbon-phenol resins, hydrocarbon-halogenated phenol resins, hydrocarbon-alkylated phenol resins and any combination thereof.

16. The baseball bat according to claim 14 wherein the poly(oxyalkylene) epoxide is polyoxypropylene diepoxide.

17. The baseball bat according to claim 12 wherein said core is wood.

18. The baseball bat according to claim 12 wherein said fibers are selected from the group consisting of fiberglass, polyester, graphite, aramids and natural fibers.

19. The baseball bat according to claim 18 wherein the fibers have a yield of about 248 yds/lb. to 1048 yds/lb.

20. The baseball bat according to claim 12, wherein said resin is selected from the group consisting of resins including epoxies, saturated and unsaturated polyesters, styrenics, acrylics, polyimides, polyvinyl acetates, polyurethanes, polyamides, (meth)acrylates, poly(vinyl acetals), polystyrene/acrylonitrile copolymers, polyoxymethylene, and urethane modified vinyl esters.

21. The baseball bat according to claim 20, wherein said resin is a vinyl ester resin.

22. The baseball bat according to claim 21, wherein said vinyl ester resin is the reaction product of an unsaturated polycarboxylic acid with an epoxy resin.

23. A baseball bat comprising a core having a barrel portion, a handle portion, and a longitudinal axis extending through said barrel portion and handle portion, said handle portion being narrower than said barrel portions at least one reinforcing sleeve positioned at about 0° relative to the first plane normal to the longitudinal axis of and positioned on said core handle and core barrel portions, continuous first fibers wound only around said core, wherein said first fibers are wound around said at least one reinforcing sleeve position of said barrel portion at angle of about 90° relative to a first plane normal to the longitudinal axis of said core to provide at least one layer of first fibers around said core barrel portion; and continuous second filaments wound only around at least one reinforcing sleeve of said handle portion at angle of about 35° to 55° relative to a first plane normal to the longitudinal axis to provide at least one layer of second fibers; and an epoxy resin impregnated on said and first and second fibers.

24. The baseball bat according to claim 23 wherein said resin is an epoxy resin comprising a Component A comprising a glycidyl ether of polyhydroxy hydrocarbons and a poly(oxyalkylene) epoxide and a Component B comprising a poly(oxyalkylene) amine and a phenol having 5 to 15 carbons.

25. The baseball bat according to claim 24 wherein the polyhydroxy hydrocarbon is selected from the group consisting of dihydroxy phenols, bisphenols, halogenated bisphenols, alkylated bisphenols, trisphenols, hydrogenated bisphenols, phenol-adlehyde resins, halogenated phenol-aldehyde novolac resins, alkylated phenol-aldehyde novolac resins, phenol-hydroxybenzaldehyde resins, alkylated phenol-hydroxybenzaldehyde resins, hydrocarbon-phenol resins, hydrocarbon-halogenated phenol resins, hydrocarbon-alkylated phenol resins and any combination thereof.

26. The baseball bat according to claim 24 wherein the poly(oxyalkylene) epoxide is polyoxypropylene diepoxide.

27. The baseball bat according to claim 23 wherein said core is wood.

28. The baseball bat according to claim 23 wherein said fibers are selected from the group consisting of fiberglass, polyester, graphite, aramids and natural fibers.

29. A method of making a baseball bat comprising the steps of:
   (a) coating a core with a first resin, the core having a longitudinal axis;
   (b) winding continuous first fibers only around a barrel portion of the core at an angle of about 35° to 55° relative to a first plane normal to the longitudinal axis to provide at least one layer of first fibers around the core barrel portion;
   (c) winding continuous second fibers only around a throat portion of the core an angle of about 15° to 35° relative to the first plane normal to the longitudinal axis to provide at least one layer of second fibers around the core throat portion;
   (d) winding continuous third fibers only around a transition portion of the core between said core barrel and core throat portions at an angle of about 25° to 55° relative to the first plane normal to the longitudinal axis to provide at least one layer of third fibers around the core transition portion;
   (e) winding continuous fourth fibers only around a handle portion of the core at an angle of about 5° to 25° relative to the first plane normal to the longitudinal axis to provide at least one layer of fourth fibers around the core handle portion; and
   (f) winding continuous fifth fibers only around a knob portion of the core at an angle of about 35° to 55° relative to the first plane normal to the longitudinal axis to provide at least one layer of fifth fibers around the core knob portion.

30. A baseball bat comprising a core, continuous fibers wound around said core to provide at least one layer of said fibers and a two-part epoxy resin impregnated on said fibers, said epoxy resin having a Component A comprising a glycidyl ether of polyhydroxy hydrocarbons and a poly(oxyalkylene) epoxide and a Component B comprising a poly(oxyalkylene) amine and a phenol having 5 to 15 carbons.

31. The baseball bat according to claim 30 wherein the polyhydroxy hydrocarbon is selected from the group consisting of dihydroxy phenols, bisphenols, halogenated bisphenols, alkylated bisphenols, trisphenols, hydrogenated bisphenols, phenol-adlehyde resins, halogenated phenol-aldehyde novolac resins, alkylated phenol-aldehyde novolac resins, phenol-hydroxybenzaldehyde resins, alkylated phenol-hydroxybenzaldehyde resins, hydrocarbon-phenol resins, hydrocarbon-halogenated phenol resins, hydrocarbon-alkylated phenol resins and any combination thereof.

32. The baseball bat according to claim 30 wherein the poly(oxyalkylene) epoxide is polyoxypropylene diepoxide.

33. The baseball bat according to claim 30 wherein the poly(oxyalkylene) amine is polyoxypropylene diamine.

34. The baseball bat according to claim 30 wherein the phenol is nonyl phenol.

35. The baseball bat according to claim 30 wherein said core is wood.

36. The baseball bat according to claim 30 wherein said fibers are selected from the group consisting of fiberglass, polyester, graphite, aramids and natural fibers.

* * * * *